US008983199B2

(12) United States Patent
Lee (10) Patent No.: US 8,983,199 B2
(45) Date of Patent: Mar. 17, 2015

(54) APPARATUS AND METHOD FOR GENERATING IMAGE FEATURE DATA (75) Inventor: Jaehyung Lee, Gyeonggi-do (KR)

(73) Assignee: Enswers Co., Ltd., Seoul (KR)

( * ) Notice: Subject to any disclaimer, the term of this patent is extended or adjusted under 35 U.S.C. 154(b) by 63 days.

(21) Appl. No.: 13/985,129

(22) PCT Filed: Nov. 11, 2011

(86) PCT No.: PCT/KR2011/008600
§ 371 (c)(1),
(2), (4) Date: Oct. 21, 2013

(87) PCT Pub. No.: WO2012/111906
PCT Pub. Date: Aug. 23, 2012

(65) Prior Publication Data
US 2014/0050411 A1  Feb. 20, 2014

(30) Foreign Application Priority Data
Feb. 14, 2011 (KR) .................. 10-2011-0012741

(51) Int. Cl.
*G06K 9/46* (2006.01)
*G06T 7/00* (2006.01)
(52) U.S. Cl.
CPC .............. *G06T 7/00* (2013.01); *G06K 9/4671* (2013.01)
USPC ............ 382/190; 382/103; 382/115; 382/128
(58) Field of Classification Search
None
See application file for complete search history.

(56) References Cited

U.S. PATENT DOCUMENTS

| 6,711,293 | B1 |  | 3/2004 | Lowe |
| 7,627,178 | B2 | * | 12/2009 | Suzuki et al. ................. 382/190 |
| 8,150,164 | B2 |  | 4/2012 | Oh et al. |
| 8,160,366 | B2 | * | 4/2012 | Nakamura et al. ............ 382/190 |
| 8,452,088 | B1 | * | 5/2013 | De Ponti et al. .............. 382/165 |
| 8,453,075 | B2 | * | 5/2013 | Guo et al. ........................ 716/52 |
| 8,457,409 | B2 | * | 6/2013 | Lo .................................. 382/190 |
| 8,553,980 | B2 | * | 10/2013 | Ahn et al. ...................... 382/173 |
| 8,625,902 | B2 | * | 1/2014 | Baheti et al. .................. 382/190 |
| 8,687,920 | B2 | * | 4/2014 | Morel et al. ................... 382/296 |

(Continued)

FOREIGN PATENT DOCUMENTS

| KR | 10-2000-0054305 A | 9/2000 |
| KR | 10-2008-0088778 A | 10/2008 |
| KR | 10-2010-0097297 A | 9/2010 |

OTHER PUBLICATIONS

Herbert Bay et al., "SURF: Speeded Up Robust Features", Proceedings of the 9th European Conference on Computer Vision, 2006, pp. 404-417, vol. 3951, Part 1.

*Primary Examiner* — Jayesh A Patel
(74) *Attorney, Agent, or Firm* — Rabin & Berdo, P.C.

(57) ABSTRACT

The present invention relates to an apparatus and method for efficiently generating feature data which properly determines a feature point indicating features of images and describes the feature point. The apparatus for generating image feature data comprises: a feature point determining unit which determines a feature point from an image and extracts information on the determined feature point; a feature point filtering unit which determines, as a final feature point, at least one feature point from among the feature points determined by the feature point determining unit; and a feature data generating unit which generates image feature data based on the final feature points determined by the feature point filtering unit and feature point information on the final feature points.

13 Claims, 7 Drawing Sheets

(56) References Cited

U.S. PATENT DOCUMENTS

| | | | |
|---|---|---|---|
| 8,774,508 B2* | 7/2014 | Anbai et al. | 382/170 |
| 8,885,984 B1* | 11/2014 | Lavi et al. | 382/305 |
| 2005/0213818 A1* | 9/2005 | Suzuki et al. | 382/190 |
| 2006/0204103 A1* | 9/2006 | Mita et al. | 382/190 |
| 2007/0160308 A1* | 7/2007 | Jones et al. | 382/260 |
| 2008/0166026 A1* | 7/2008 | Huang et al. | 382/118 |
| 2008/0240574 A1 | 10/2008 | Geun et al. | |
| 2008/0247651 A1* | 10/2008 | Takaki et al. | 382/219 |
| 2009/0238460 A1 | 9/2009 | Funayama et al. | |
| 2009/0297050 A1* | 12/2009 | Li et al. | 382/225 |
| 2013/0015946 A1* | 1/2013 | Lau et al. | 340/5.2 |
| 2014/0093142 A1* | 4/2014 | Hayasaka et al. | 382/118 |

* cited by examiner

APPARATUS AND METHOD FOR GENERATING IMAGE FEATURE DATA

TECHNICAL FIELD

The present invention relates, in general, to an apparatus and method for generating image feature data and, more particularly, to an apparatus and method that can suitably determine feature points indicating the features of an image and efficiently generate feature data describing the feature points.

BACKGROUND ART

Generally, feature points (or interest points) are points capable of representing the features of an image, and denote points capable of desirably describing the features of an image or a set of points, regardless of variations in the scale, rotation, or distortion of an image. As feature points, several thousands or several tens of thousands of feature points per picture, for example, may be extracted although they differ depending on the size and content of a given image and the type of feature point extraction/determination method. Such feature points are widely used in the field of image processing or computer vision, and are used in various tasks, such as object recognition, motion tracking, and determination of identicalness between images by, for example, extracting feature points and searching two images for corresponding parts using the feature data of the extracted feature points.

As conventional technology for extracting/determining feature points from a given image, various types of methods have been proposed, including the known methods using maximum/minimum values of the scale space of a Laplacian of Gaussian (LoG) filter or a Difference of Gaussians (DoG) filter. In addition, methods of determining feature points using a determinant of a Hessian matrix are also known.

However, in accordance with the conventional feature point extraction/determination methods, there are many cases where an excessively large number of feature points are obtained from a given image, so that limitations are reached in that the amount of data to be processed in a post-processing procedure becomes excessive, and thus operation time is greatly lengthened. Further, there is a disadvantage in that the amount of feature data formed for each of the extracted/determined feature points and the processing time of the feature data also excessively increase.

Meanwhile, as methods of extracting feature points from an image and forming feature data of the extracted feature points, there are various proposed methods, such as a Scale-Invariant Feature Transform (SIFT) algorithm disclosed in U.S. Pat. No. 6,711,293 (by David G. Lowe) and a Speed Up Robust Features (SURF) algorithm (by H. Bay, T. Tuytelaars and L. van Gool (2006), "SURF: Speeded Up Robust Features", Proceedings of the 9th European Conference on Computer Vision, Springer LNCS volume 3951, part 1. pp. 404-417). However, since such conventional feature data formation method requires approximately several thousands of several tens-dimensional feature vectors per image, there is a problem in that the operation process is complicated, and the amount of data to be processed is large, so that an excessively long computation time is required, thus causing many problems when a large amount of image data must be processed.

DISCLOSURE

Technical Problem

Accordingly, the present invention has been made keeping in mind the above problems, and an object of the present invention is to provide a method and apparatus that can effectively determine feature points from an image.

Another object of the present invention is to provide a method and apparatus that can suitably select feature points capable of desirably representing the features of an image when the number of feature points in the image is excessively large.

A further object of the present invention is to provide a method and apparatus that can generate feature data of feature points capable of greatly reducing the amount of data and the processing and operation time of data while desirably describing the features of each of the feature points of an image.

Yet another object of the present invention is to provide a method and apparatus that can generate feature data of an image robust to various types of changes in the scaling, rotation, and observation angle of the image while shortening the time required to generate data and to process data.

Technical Solution

In order to accomplish the above objects, the present invention provides an apparatus for generating feature data of an image, including a feature point determination unit for determining feature points from an image and extracting feature point information for the determined feature points; a feature point filtering unit for determining one or more of the feature points determined by the feature point determination unit to be final feature points; and a feature data generation unit for generating feature data of the image based on the final feature points determined by the feature point filtering unit and feature point information for the final feature points.

In this case, the feature point information extracted by the feature point determination unit may include intensities of the feature points, and the feature point filtering unit may determine a point having a larger intensity than other points located in a surrounding area of a corresponding feature point to be a final feature point, based on the intensities of the feature points.

Further, the feature point filtering unit may determine important points $R_2(c_i)$ satisfying expression $$R_2(c_i) = \left\{ c_i \,\middle|\, f(c_i) > \max_{R_1(c_i)} [f(c_i)] \times T_1 \right\}$$

among the points located in the surrounding area of the feature point (where $c_i$ denotes an i-th feature point, $f(c_i)$ denotes intensity of the i-th feature point, $R_1(c_i)$ denotes a set of points in the surrounding area of the feature point, $$\max_{R_1(c_i)} [f(c_i)]$$

denotes a maximum value of intensities of $R_1(c_i)$, and $T_1$ denotes a threshold) and determines a feature point satisfying expression $$f(c_i) > \frac{\sum_{c_i \in R_2(c_i)} f(c_i)}{\#(R_2(c_i))} \times T_2$$

to be the final feature point (where # denotes an operator for obtaining a size of the set and $T_2$ denotes a threshold).

In accordance with another aspect of the present invention, there is provided a method of generating feature data of an image, including determining feature points from an image and extracting feature point information for the determined feature points; determining one or more of the determined feature points to be final feature points; and generating feature data of the image based on the determined final feature points and feature point information for the final feature points.

In accordance with a further aspect of the present invention, there is provided an apparatus for generating feature data of an image, including a feature point determination unit for determining feature points from an image and extracting feature point information for the determined feature points; a feature point orientation estimation unit for estimating pieces of orientation information for the respective feature points determined by the feature point determination unit; and a feature data generation unit for generating binary feature vectors based on the feature point information and the orientation information, for the respective feature points determined by the feature point determination unit, and generating feature data of the image including the generated binary feature vectors.

In this case, the feature point orientation estimation unit may calculate, for all points in a predetermined surrounding area of each feature point, surrounding gradients of the points, and obtain an average of orientations of the gradients, thus estimating orientation of the feature point.

Further, the feature data generation unit may generate the binary feature vectors based on the feature point information and the orientation information, for the respective feature points determined by the feature point determination unit, and generate the feature data of the image including the generated binary feature vectors.

In this case, the feature data generation unit may generate, for the feature points, surrounding image areas including the respective feature points, align the generated surrounding images areas in an identical orientation, divide each of the aligned surrounding image areas into sub-regions, and generate the binary feature vectors based on averages of brightness values of the subs-regions.

Further, each binary feature vector may be generated by at least one selected from among difference vectors and double-difference vectors obtained from the averages of brightness values of the sub-regions.

Furthermore, selection of at least one from among the difference vectors and the double-difference vectors obtained from averages of brightness values of the sub-regions may be performed in correspondence with respective bits of the binary feature vector.

Furthermore, a linear combination or a nonlinear combination may be calculated for the difference vectors and the double-difference vectors selected in correspondence with the respective bits, and resulting values of the calculation may be compared with a threshold, thus enabling values of corresponding bits of the binary feature vector to be determined.

Furthermore, alignment may be performed based on a criterion preset for the respective bits of the binary feature vector.

Furthermore, the feature data of the image may further include one or more of location information, size information, and orientation information of each feature point.

Furthermore, the feature point determination unit may further include a feature point filtering unit for determining one or more of the determined feature points to be final feature points.

Furthermore, the feature point information extracted by the feature point determination unit may include intensities of the feature points, and the feature point filtering unit may determine a point having a larger intensity than other points located in a surrounding area of a corresponding feature point to be a final feature point, based on the intensities of the feature points.

Furthermore, the feature point filtering unit may determine important points $R_2(c_i)$ satisfying expression $$R_2(c_i) = \left\{ c_i \,\middle|\, f(c_i) > \max_{R_1(c_i)} [f(c_i)] \times T_1 \right\}$$

among the points located in the surrounding area of the feature point (where $c_i$ denotes an i-th feature point, $f(c_i)$ denotes intensity of the i-th feature point, $R_1(c_i)$ denotes a set of points in the surrounding area of the feature point, $$\max_{R_1(c_i)} [f(c_i)]$$

denotes a maximum value of intensities of $R_1(c_i)$, and $T_1$ denotes a threshold) and determine a feature point satisfying expression $$f(c_i) > \frac{\sum_{c_i \in R_2(c_i)} f(c_i)}{\#(R_2(c_i))} \times T_2$$

to be the final feature point (where # denotes an operator for obtaining a size of the set and $T_2$ denotes a threshold).

In accordance with yet another aspect of the present invention, there is provided a method of generating feature data of an image, including determining feature points from an image and extracting feature point information for the determined feature points; estimating pieces of orientation information for the respective determined feature points; and generating binary feature vectors based on the feature point information and the orientation information, for the respective determined feature points, and generating feature data of the image including the generated binary feature vectors.

Advantageous Effects

According to the present invention, there can be provided a method and apparatus that can effectively determine feature points from an image. In particular, according to the present invention, there can be provided a method and apparatus that can suitably select feature points capable of desirably representing the features of an image when the number of feature points in the image is excessively large.

Further, the present invention is advantageous in that it can generate feature data of feature points capable of greatly reducing the amount of data and the processing and operation time of data while desirably describing the features of each of the feature points of an image.

Furthermore, the present invention is advantageous in that it can generate feature data of an image robust to various types of changes in the scaling, rotation, and observation angle of the image while shortening the time required to generate data and to process data.

Furthermore, when the feature data generated according to the present invention is used in fields, such as image matching, object tracking, and the determination of image identicalness, processing and operation time are greatly shortened compared to conventional technology, so that tasks related to the feature data of an image can be promptly and efficiently performed, and the feature data of an image having robust characteristics regardless of various types of changes in the scaling, rotation, and observation angle of the image, can be generated and used, thus greatly improving the entire task time and efficiency.

DESCRIPTION OF DRAWINGS

FIG. 8 is a flowchart showing an image feature data generation method implemented by the image feature data generation apparatus 20 of FIGS. 3 to 7.

BEST MODE

Hereinafter, embodiments of the present invention will be described in detail with reference to the attached drawings.

Figure 1:
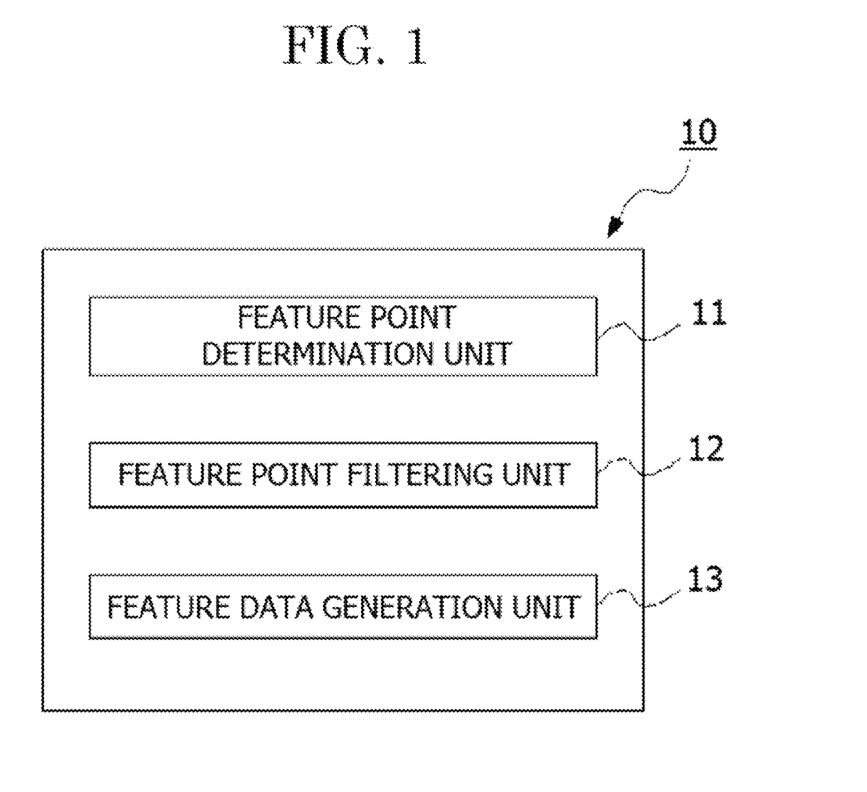
FIG. 1 is a block diagram showing the configuration of an image feature data generation apparatus 10 according to an embodiment of the present invention.

FIG. 1 is a block diagram showing an apparatus 10 for generating image feature data according to an embodiment of the present invention.

Referring to FIG. 1, the image feature data generation apparatus 10 includes a feature point determination unit 11, a feature point filtering unit 12, and a feature data generation unit 13, and performs the function of, based on the configuration, suitably determining feature points of a given image and generating feature data from the determined feature points.

The feature point determination unit 11 functions to determine feature points from an image and extract feature point information of the determined feature points. Here, the "image" refers to still image data and denotes, for example, digital data represented by a file format such as jpg, bmp, or tif. Further, as described above in the field "Background art," features points (or interest points) of an image denote points capable of desirably describing the features of the image compared to other points of the corresponding image, and points that can always be uniformly detected in the image regardless of changes in scaling, rotation, and observation angle are generally determined to be feature points.

The feature point determination unit 11 may use a feature point extraction/determination method well known in the prior art without change. As described above, a method using maximum/minimum values of the scale space of a Laplacian of Gaussian (LoG) filter or a Difference of Gaussians (DoG) filter, a method using a determinant of a Hessian matrix, or the like is used, and then points that can be feature points in the given image can be determined.

Meanwhile, a Scale-Invariant Feature Transform (SIFT) algorithm disclosed in U.S. Pat. No. 6,711,293 (by David G. Lowe), a Speed Up Robust Features (SURF) algorithm disclosed in U.S. Patent Application Publication No. 2009/0238460, or the like presents the entire process for generating feature vectors including the extraction/determination of feature points of an image, and the image feature point extraction/determination method disclosed in the process may also be used. The feature point determination unit 11 of the present invention may use all types of feature point extraction/determination methods known in the prior art, but this is not a core part the present invention, and thus a detailed description thereof will be omitted.

Meanwhile, as described above, at the same time that the feature point determination unit 11 finds the feature points of an image, it also extracts other types of feature point information, such as the intensities or sizes of the feature points related to the feature points. Since the type and detailed content of feature point information may differ according to the feature point extraction/determination method that is used, they are selectively extracted according to the data used in a post-processing procedure, such as image matching, object tracking, and image comparison.

The intensities of feature points may vary according to the feature point extraction/determination method that is used. For example, when a Laplacian of Gaussian (LoG) filter is used, a Laplacian operator may be used as the intensity of each feature point.

When the convolution of a given image f(x, y) and a Gaussian kernel $$g(x, y, t) = \frac{1}{\sqrt{2\pi t}} e^{-(x^2+y^2)/(2t)}$$

is performed for a predetermined scale t, a LoG scale space may be represented by L(x, y, t)=g(x, y, t)*f(x, y), and in this case, the Laplacian operator $\nabla^2 L = L_{xx} + L_{yy}$ may be calculated. Since the resulting values of the Laplacian operator individually exhibit large values in a dark point (blob) and a bright point (blob) among the points of the image, they may be data required to basically determine whether the corresponding image can be used for feature points. Depending on the magnitudes of the values, the resulting values may be used as indices indicating the intensities of feature points.

Meanwhile, similarly, even when a Difference of Gaussian (DoG) filter is used, the resulting values of a Laplacian operator can be used as the intensities of feature points. Further, when a Hessian matrix is used, values of the determinant of the Hessian matrix can be used as the intensities of feature points. In this way, the intensities of feature points may be implemented using information based on discriminants used to extract/determine feature points of an image according to the prior art.

Meanwhile, the size of the feature point of an image denotes information about an area occupied by the corresponding feature point in the image, and may be represented by, for example, the length of each side in the case of a rectangle, the length of a radius in the case of a circle, etc. The size of a feature point may also be obtained by a method used in the prior art. For example, when the above-described Laplacian of Gaussian (LOG) filter is used, a value such as the k multiple of a scale t (or t̂) indicating the maximum intensity of the feature point (where k is any constant, such as 4 or 6) may be used.

Meanwhile, the feature point filtering unit 12 performs the function of determining one or more of the feature points determined by the feature point determination unit 11 to be final feature points. Since the number of feature points determined by the feature point determination unit 11 may typically range from a minimum of several tens to a maximum of several thousands or several tens of thousands per image, there is a need to select (sort) feature points having clearer features than those of other feature points, from a plurality of feature points, in order to perform large-capacity and high-speed processing. The feature point filtering unit 12 functions to select feature points having clearer and more definite features than other feature points from the feature points determined by the feature point determination unit 11, and select the sorted feature points as the final feature points.

The feature point filtering unit 12 may select feature points using the following method. For example, for an image having a size of W×H, when the intensity of an i-th point of feature points $c_1, c_2, \ldots, c_N$ determined by the feature point determination unit 11 is $f(c_i)$, and a set of points belonging to the surrounding area of each point, for example, an area within a radius of min(W,H)/10, is $R_1(c_i)$, whether the point $c_i$ can be finally selected as a feature point may be determined by first searching for relatively important points $R_2(c_i)$ around the corresponding point using the equation $$R_2(c_i) = \left\{ c_i \,\middle|\, f(c_i) > \max_{R_1(c_i)} [f(c_i)] \times T_1 \right\},$$

and then determining feature points satisfying the following expression defined using the found feature points to be final feature points, $$f(c_i) > \frac{\sum_{c_i \in R_2(c_i)} f(c_i)}{\#(R_2(c_i))} \times T_2$$

where # denotes an operator for obtaining the size of a set, and T1 and T2 denote thresholds that can be optimized.

By using the above expression, neighboring important points $R_2(c_i)$ around any feature point are found, and the corresponding feature point may be finally selected as the feature point when the intensity of the corresponding feature point is relatively greater than those of the neighboring important points using the intensities of the important points. That is, even for an image having a locally large variation or an image having complicated texture, a small number of feature points desirably representing the entire area may be stably sorted, and the number of feature points determined by the feature point determination unit 11 may be reduced to several tens from several hundreds.

Here, as described above with reference to the feature point determination unit 11, values obtained from the expression required to determine whether corresponding points are feature points in the algorithm used by the feature point determination unit 11, as in the case of a Laplacian operator, may be used as intensities.

Meanwhile, as described above, the feature data generation unit 13 functions to generate the feature data of the image based on the final feature points determined by the feature point filtering unit 12 and the feature point information of the final feature points. The term "feature data" generally denotes data (descriptor) describing information related to feature points extracted/determined for a given image. This feature data is usefully used in a post-processing procedure, for example, object tracking, image matching, and the determination of identicalness between images. Such feature data may be generated in various forms depending on the type, condition or algorithm of the post-processing procedure. The feature data generation unit 13 in the embodiment of FIG. 1 may use a feature data generation method known in the prior art without change. For example, feature data may include the coordinates, orientation information, feature vectors, etc. of feature points. Further, the feature data generation unit 13 in the embodiment of FIG. 1 may also use a feature data generation method used in an embodiment, which will be described later, and this will be described in detail later with reference to FIG. 3.

Figure 2:
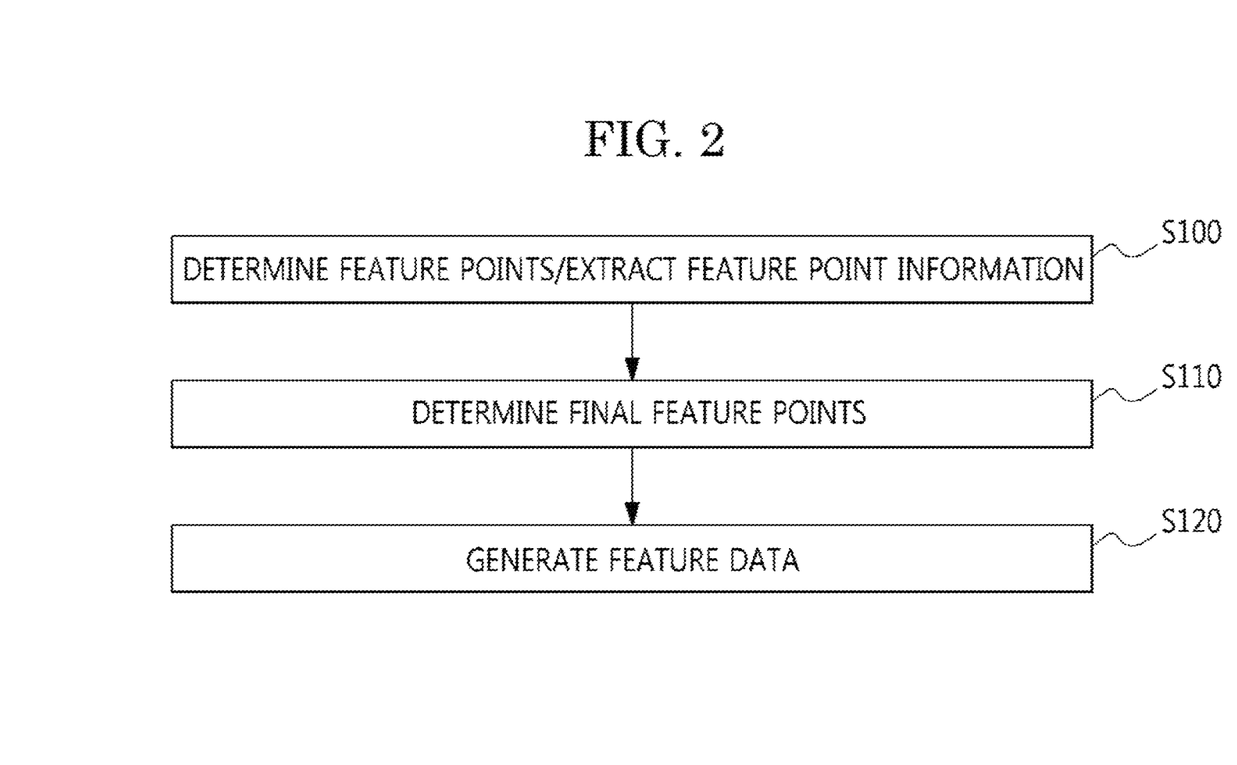
FIG. 2 is a flowchart showing an embodiment of an image feature data generation method implemented by the image feature data generation apparatus 10 of FIG. 1.

FIG. 2 is a flowchart showing an image feature data generation method implemented by the image feature data generation apparatus 10 of FIG. 1.

Referring to FIG. 2, the feature point determination unit 11 determines feature points from a given image and extracts feature point information of the determined feature points, as described above (S100).

Next, the feature point filtering unit 12 determines one or more of the feature points determined by the feature point determination unit 11 to be final feature points (S110). This may be performed using a method of defining the intensities of feature points using expressions used to determine feature points in the feature point determination unit 11 and determining feature points having higher intensities than other neighboring points to be final feature points based on the intensities of the feature points, as described above.

If the final feature points have been determined, the feature data generation unit 13 generates the feature data of the image based on the final feature points determined by the feature point filtering unit 12 and the feature point information of the final feature points (S120).

Figure 3:
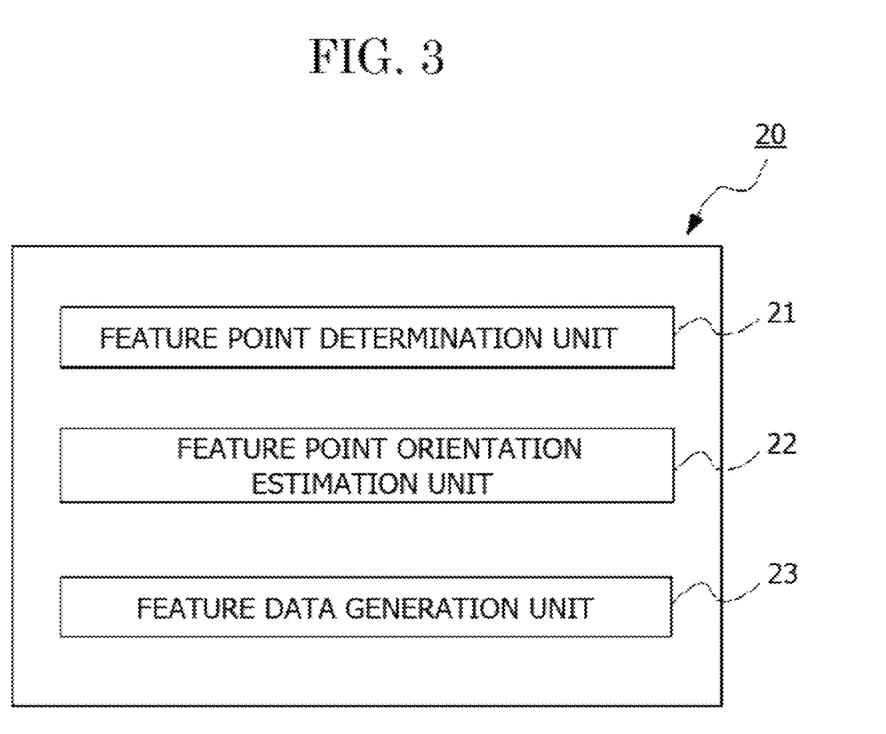
FIG. 3 is a diagram showing the configuration of an image feature data generation apparatus 20 according to another embodiment of the present invention.

FIG. 3 is a diagram showing the configuration of an image feature data generation apparatus 20 according to another embodiment of the present invention.

Referring to FIG. 3, the image feature data generation apparatus 20 according to the present embodiment includes a feature point determination unit 21, a feature point orientation estimation unit 22, and a feature data generation unit 23.

The configuration and operation of the feature point determination unit 21 are identical to those of the feature point determination unit 11 described in the embodiments of FIGS. 1 and 2, and thus a detailed description thereof will be omitted. Meanwhile, in the configuration of FIG. 3, the feature point filtering unit 12 is omitted compared to the embodiments of FIGS. 1 and 2. The embodiments of FIGS. 1 and 2 are characterized in that a suitable number of feature points are sorted, but the present embodiment relates to a scheme for generating feature data about determined feature points as long as the feature points are determined, regardless of the procedure for determining and sorting feature points, and thus the feature point filtering unit 12 of FIGS. 1 and 2 is not necessarily used. Of course, it is apparent that the configuration may be implemented to include the feature point filtering unit 12, and an embodiment of the case where the feature point filtering unit 12 is included will be separately described later.

The feature point orientation estimation unit 22 functions to estimate pieces of orientation information for the respective feature points determined by the feature point determination unit 22. This may be implemented using various gradient-based methods well known in the prior art. For example, for all points in the predetermined surrounding area of each feature point, surrounding gradients of respective points are calculated and the orientation thereof are averaged, and thus the orientation information of the feature points may be estimated. In accordance with this method, even if the feature points undergo arbitrary rotation transformation, original orientation may be estimated. A method of estimating the orientation of feature points in the feature point orientation estimation unit 22 may also be implemented using a method well known in the prior art, but this is not a component directly related to the present embodiment, and thus a detailed description thereof is omitted.

The feature data generation unit 23 functions to generate binary feature vectors based on feature point information and orientation information for the respective feature points determined by the feature point determination unit 21, and generate the feature data of the image including the generated binary feature vectors. In this case, the feature point information may be extracted and generated by the feature point determination unit 21, and the orientation information is generated by the above-described feature point orientation estimation unit 22.

The feature data generation unit 23 may generate binary feature vectors so that feature data can be generated using a relatively small amount of data while desirably representing the features of the corresponding feature points at the same time that the relation analysis unit 20 can perform prompt processing in a post-processing procedure such as image matching, object tracking, and image comparison using the feature data, and may finally configure feature data including the binary feature vectors. Such binary feature vectors must not deteriorate features unique to the feature points while maintaining robustness to the respective feature points.

Figure 4:
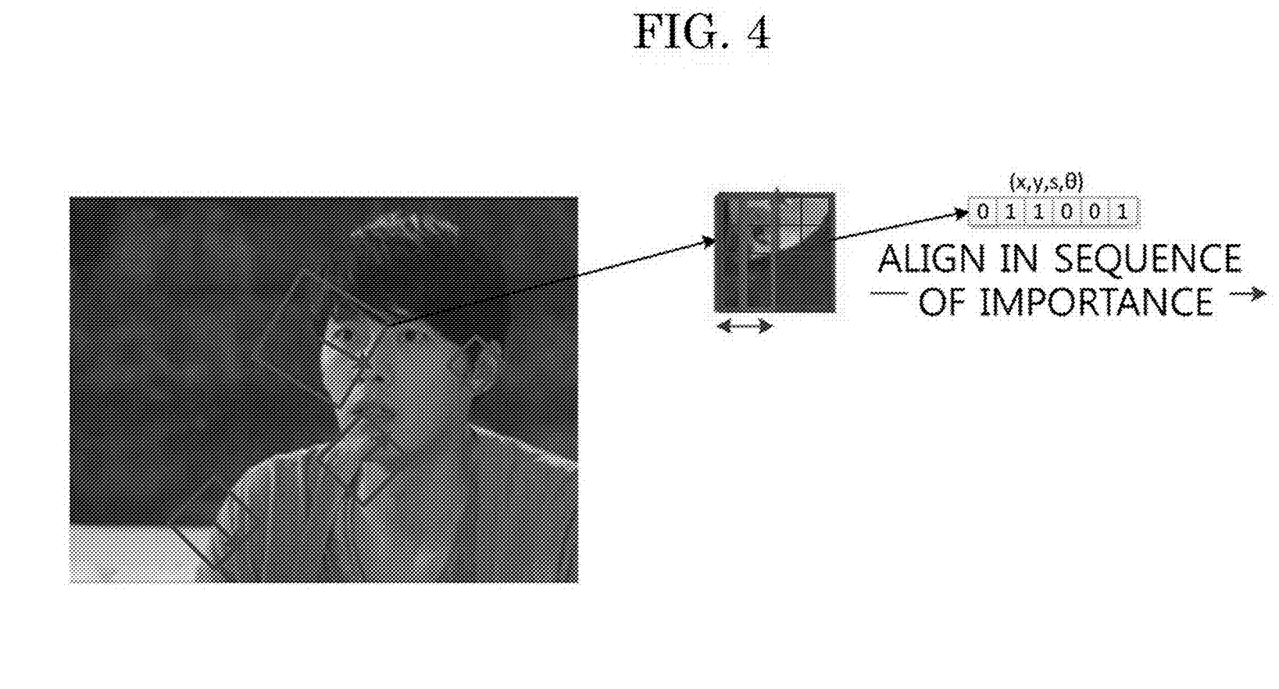
FIG. 4 illustrates a screen showing an actual example of a binary feature vector generation process.

A process in which the feature data generation unit 23 generates a binary feature vector will be described with reference to FIGS. 4 and 5. FIG. 4 illustrates a screen showing an actual example of a process for generating a binary feature vector, and FIG. 5 is a flowchart showing the process for generating a binary feature vector.

Figure 5:
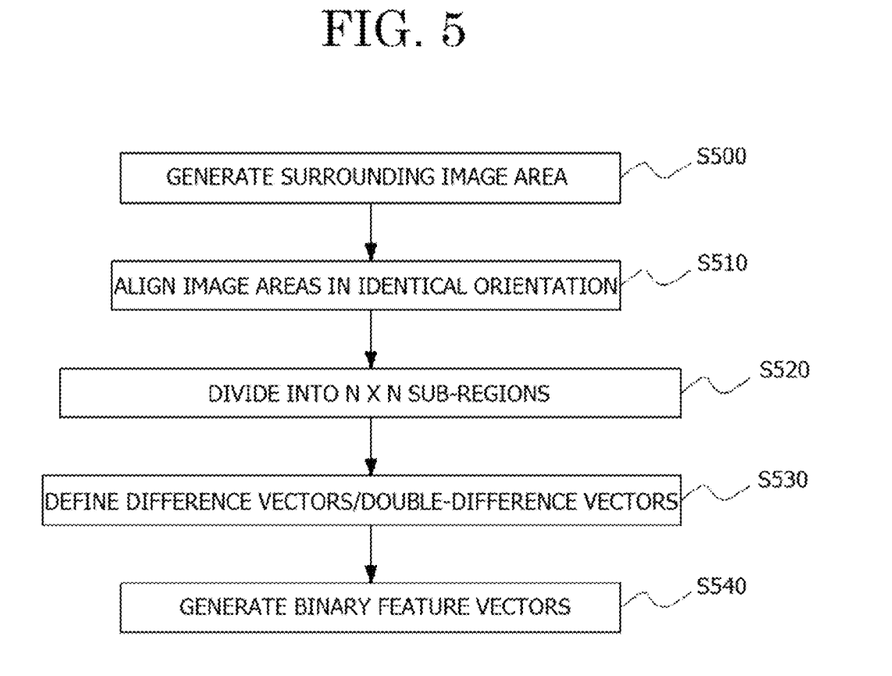
FIG. 5 is a flowchart showing the binary feature vector generation process.

Referring to FIGS. 4 and 5, for the feature points determined through the above-described process, surrounding image areas including the respective feature points are generated in the form of, for example, a rectangular shape using the size and orientation information of the feature points, and the surrounding image areas are aligned in the same orientation (S500, S510).

In this case, the generation of the surrounding image area including the corresponding feature point in the form of a rectangular shape may be performed using size information included in the feature point information extracted by the feature point determination unit 11. For example, the rectangular surrounding image area may be generated by using information such as the length of one side (in the case of a square), the lengths of horizontal and vertical sides (in the case of a rectangle), or a radius (in the case of a circle), as the size information.

For example, when the length of one side is given, a square based on the length of the corresponding side may be generated, and when the lengths of horizontal and vertical sides are given, a square having a larger or smaller of the values as the length of each side may be generated. Further, when a radius is given, a square having the radius as the length of each side may be generated. Furthermore, the reason for aligning the generated surrounding image areas in the same orientation is to obtain the same feature vector even if a target image is a rotated form of another image.

Meanwhile, when a surrounding image area including a feature point is generated, a method of generating the surrounding image area in a rectangular shape based on coordinates within a preset size, for example, a range of ±10 around the feature point, rather than based on the size information of the feature point, may be implemented.

Next, each of the generated and aligned image areas is divided into N×N sub-regions, as shown in the right portion of FIG. 4 (S520). N×N values obtained by averaging the image brightness values of respective sub-regions are assumed to be $I(i)$, $i=1, 2, \ldots, N^2$, and brightness difference vectors and brightness double-difference vectors are defined by the following equations (S530).

Difference vector: $D(i,j)=I(i)-I(j), i,j=1,2,\ldots,N^2$

Double-difference vector: $E(i,j,k,l)=D(i,j)-D(k,l), i,j,k, l=1,2,\ldots,N^2$

Next, the feature data generation unit 23 selects one or more of the difference vectors $D(i, j)$ and the double-difference vectors $E(i, j, k, l)$ defined by the above equations, and generates a binary feature vector based on the selected vectors (S540).

Figure 6:
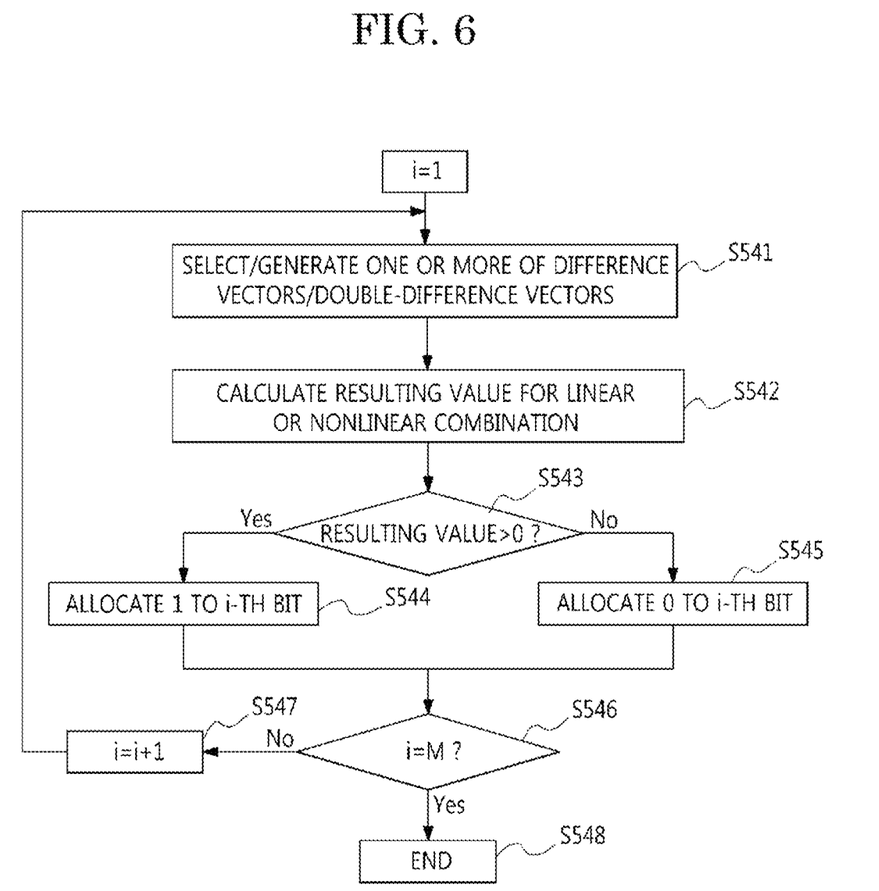
FIG. 6 is a flowchart showing an example of a detailed process for generating a binary feature vector based on a difference vector and a double-difference vector.

An example of a detailed process for generating a binary feature vector based on the difference vectors and the double-difference vectors is shown in FIG. 6.

The example of FIG. 6 relates to a case where a binary feature vector is composed of M bits, wherein the process of FIG. 6 is repeated M times. For this, i=1 is initially set, one or more of difference vectors and double-difference vectors defined for a given feature point are selected, and the difference vectors and the double-difference vectors are generated based on the defined equations (S541).

Which of the defined difference vectors and double-difference vectors are to be selected may be previously set. For example, binary feature vectors are previously generated through a plurality of sample images, and which of difference vectors and double-difference vectors must be selected so as to exhibit robust characteristics regardless of changes in images is determined based on the statistical values of the binary feature vectors, and thus the corresponding vectors conforming to such a criterion may be selected. Further, vectors may be selected only from among difference vectors or double-difference vectors.

Furthermore, the number of difference vectors to be selected and the number of double-difference vectors to be selected may also vary depending on circumstances. For example, it is possible to select three difference vectors and two double-difference vectors, or to select two difference vectors and three double-difference vectors.

In addition, the selection and generation of at least one of difference vectors and double-difference vectors must be performed M times corresponding to the number of bits of each binary feature vector, but sets of selected difference vectors and double-difference vectors must differ, and thus it is preferable to preset sets of different difference vectors and different double-difference vectors so that different sets of difference vectors and double-difference vectors are selected each time.

Next, linear combinations are calculated for the selected and generated difference vectors and double-difference vectors (S542). For example, when the number of selected and generated difference vectors is four, that is, $D(1,2)$, $D(3,4)$, E(1,2,4,5), and E(3,5,6,7), linear combinations are calculated for the respective values of the difference vectors (these values have difference values and double-difference values of average brightness values, as described above).

That is, in the case of linear combinations, a linear combination represented by, for example, aD(1,2)+bD(3,4)+cE(1,2,4,5)+dE(3,5,6,7), can be calculated (where a, b, c, and d denote arbitrary coefficients).

For example, when five difference vectors and five double-difference vectors are present, the space of linear combinations thereof may be actually infinite, and specific combinations enabling the corresponding feature point to be easily distinguished from other feature points are present in the space. Such specific combinations are previously tested and determined through a plurality of sample images, and which linear combination is to be performed may be determined based on the statistical estimation of the test results. Meanwhile, it is apparent that nonlinear combinations including a nonlinear operation, such as a multiplication, as well as linear combinations, may be performed at step S542, and it is also possible to mix and use linear combinations and nonlinear combinations depending on the circumstances.

If the above process has been performed, a resulting value thereof may be obtained. It is determined whether the resulting value is greater than a predetermined threshold, for example, 0 (S543). If the resulting value is greater than 0, 1 is allocated to the corresponding bit, that is, an i-th bit (S544), whereas if the resulting value is less than 0, 0 allocated to the corresponding bit, that is, the i-th bit (S545). In this way, the i-th bit value of the binary feature vector is determined.

Thereafter, it is determined whether i=M (that is, whether a bit is a last bit) (S546). If the bit is not a last bit, i is increased (S547), and steps S541 to S547 are repeated, whereas if the bit is the last bit, the process is terminated (S548).

If the process of FIG. 6 has been completed, the binary feature vector composed of M bits, each represented by 0 or 1, is generated for the given feature point. The binary feature vector shown in the right portion of FIG. 4 is generated through the above process, and it can be seen that the binary feature vector is composed of a total of 6 bits, each being allocated 0 or 1.

Meanwhile, after the binary feature vector has been generated, an alignment procedure may be further performed on respective bits based on the importance thereof. Among linear or nonlinear combinations of difference vectors and double-difference vectors, a combination that is more robust to changes in scaling, size, or angle than any other combinations may be present. A combination having such robustness is tested and determined through a plurality of sample images, and a procedure for aligning binary feature vectors depending on the sequence thereof, that is, the sequence of robustness, may be performed using the combination.

That is, if the process of FIG. 6 is performed, when values of M bits are represented by "001010," the bit values may be aligned as "011001" depending on the importance, and such a binary feature vector is shown in the right portion of FIG. 4. In this way, when the binary feature vectors are aligned in the sequence of importance, there is an advantage in that the comparison and searching of data may be promptly processed based on the importance in a post-processing procedure.

Through the above process, if the binary feature vectors have been generated for respective feature points, the feature data generation unit 23 finally generates feature data of the image, including those binary feature vectors and other pieces of feature point information about the feature points. The other pieces of feature point information included in the feature data may include one or more of, for example, the x coordinate value, y coordinate value, size information, and orientation information of each feature point. The other pieces of feature point information may be configured to include all of the pieces of information, or to select only some of the pieces of information, and this configuration may be set differently depending on the conditions in the post-processing procedure.

For example, when the other pieces of feature point information may be configured to include all of the above-described feature point information, the finally generated feature data may be a set of final feature points, each composed of (x coordinate value, y coordinate value, size, orientation, binary feature vector). A binary number shown in the right portion of FIG. 4 denotes the binary feature vector of the corresponding feature point, and (x, y, s, θ) indicated over the binary number respectively denote (x coordinate value, y coordinate value, size, orientation). Of course, when size information is not required in the post-processing procedure, feature data may also be configured using only the remaining information other than size information.

Meanwhile, in the embodiments shown in FIGS. 4 to 6, a case where difference vectors and double-difference vectors for average values of brightness values of sub-regions are defined (S530 of FIG. 5), and one or more of the difference vectors and the double-difference vectors are selected based on the above-described criterion, and where linear or nonlinear combinations of the selected difference vectors and double-difference vectors are generated and then binary feature vectors are generated, has been described. However, it is also possible to implement an embodiment in which difference vectors and double-difference vectors are previously generated for all of the averages of brightness values of the sub-regions. In this case, difference vectors and double-difference vectors are generated for the averages of brightness values of all the sub-regions at step S530 of FIG. 5, and only a procedure for selecting vectors from among the generated difference vectors and double-difference vectors based on the above-described criterion is performed at step S541 of FIG. 6. That is, the procedure for calculating and generating difference vectors and double-difference vectors may be omitted at step S541.

Figure 7:
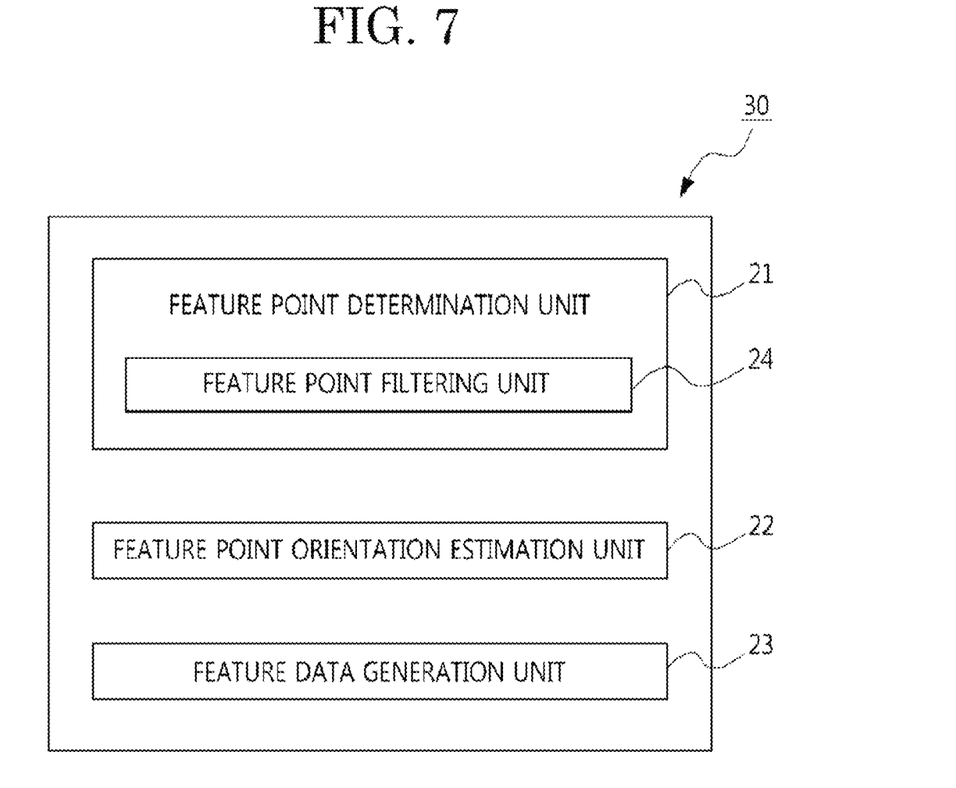
FIG. 7 is a diagram showing the configuration of an image feature data generation apparatus 30 according to a further embodiment of the present invention.

FIG. 7 is a diagram showing the configuration of an image feature data generation apparatus 30 according to a further embodiment of the present invention.

The embodiment of FIG. 7 is identical to the embodiment of FIG. 3, except that a feature point filtering unit 24 is further included in the feature point determination unit 21.

Here, the feature point filtering unit 24 is identical to that described with reference to FIGS. 1 and 2. That is, the embodiment of FIG. 7 is identical to the embodiment of FIGS. 3 to 6, except that the feature point filtering unit 24 sorts a suitable number of feature points from a plurality of feature points, and thereafter the feature point orientation estimation unit 22 and the feature data generation unit 23 generate feature data of the image, as described above with reference to FIGS. 1 and 2. Therefore, the embodiment of FIG. 7 generates binary feature vectors and forms feature data of a smaller number of feature points compared to the embodiments of FIGS. 3 to 6, so that a smaller amount of data can be configured, thus obtaining the advantage of faster operation. In FIG. 7, other components are identical to those described above, and thus a detailed description thereof will be omitted.

When feature data of the image according to the present invention is generated, prompt and efficient processing are possible in a post-processing procedure, such as image matching, object tracking and determination of identicalness between images, using a smaller amount of data while desirably representing the features of the original image using the generated feature data.

FIG. 8 is a flowchart showing an image feature data generation method implemented by the image feature data generation apparatus 20 of FIGS. 3 to 7.

Referring to FIG. 8, the feature point determination unit 21 determines feature points from an image, and extracts feature point information of the determined feature points (S800). Next, the feature point orientation estimation unit 22 estimates pieces of orientation information for the respective feature points (S810).

Next, the feature data generation unit 23 generates binary feature vectors based on the feature point information and the orientation information for the respective feature points (S820). As described above, this step may be performed by the following procedure. That is, surrounding image areas including respective feature points are generated, and the generated surrounding image areas are aligned in the same orientation, and thereafter each of the aligned surrounding image areas is divided into sub-regions. Further, averages of the brightness values of the sub-regions are obtained, difference vectors and double-difference vectors of each average are calculated, one or more of the difference vectors and the double-difference vectors are selected in correspondence with the respective bits of the corresponding binary feature vector, linear combinations are calculated for the selected difference vectors and double-difference vectors, and the resulting values of the linear combinations are compared with a threshold to determine the corresponding bit values of the binary feature vector.

If the corresponding bit values of each binary feature vector have been determined through this procedure, pieces of feature data of the image are generated for respective feature points to include information such as coordinate values, size, and orientation, as well as the binary feature vectors (S830).

As described above, although the present invention has been described with reference to the preferred embodiments of the present invention, it should be understood that the present invention is not limited to the above embodiments and various modifications and changes can be implemented without departing from the scope of the present invention.

For example, although, in the above embodiments, only an image has been described by way of example, the present invention may be applied even to videos, each being a set of images. That is, since a video may be represented by a set of images which are still images, each composed of a plurality of frames, the present invention can be applied without change if each frame constituting the video is regarded as the image of the present invention. In this case, feature data is generated from each frame of the video.

The invention claimed is:

1. An apparatus for generating feature data of an image, comprising:
    a feature point determination unit for determining feature points from an image and extracting feature point information for the determined feature points;
    a feature point filtering unit for determining one or more of the feature points determined by the feature point determination unit to be final feature points; and
    a feature data generation unit for generating feature data of the image based on the final feature points determined by the feature point filtering unit and feature point information for the final feature points,
    wherein the feature point information extracted by the feature point determination unit includes intensities of the feature points,
    wherein the feature point filtering unit determines a point having a larger intensity than other points located in a surrounding area of a corresponding feature point to be a final feature point, based on the intensities of the feature points, and
    wherein the feature point filtering unit determines important points $R_2(c_i)$ satisfying the expression $$R_2(c_i) = \left\{ c_i \,\bigg|\, f(c_i) > \max_{R_1(c_i)} [f(c_i)] \times T_1 \right\}$$

among the points located in the surrounding area of the feature point, where $c_i$ denotes an i-th feature point, $f(c_i)$ denotes intensity of the i-th feature point, $R_1(c_i)$ denotes a set of points in the surrounding area of the feature point, $$\max_{R_1(c_i)} [f(c_i)]$$

denotes a maximum value of intensities of $R_1(c_i)$, and $T_1$ denotes a threshold, and determines a feature point satisfying the expression $$f(c_i) > \frac{\sum_{c_i \in R_2(c_i)} f(c_i)}{\#(R_2(c_i))} \times T_2$$

to be the final feature point, where # denotes an operator for obtaining a size of the set and $T_2$ denotes a threshold.

2. A method of generating feature data of an image, comprising:
    determining feature points from an image and extracting feature point information for the determined feature points;
    determining one or more of the determined feature points to be final feature points; and
    generating feature data of the image based on the determined final feature points and feature point information for the final feature points,
    wherein at the extracting feature point information for the determined feature points, the feature point information includes intensities of the feature points,
    wherein the step of determining one or more of the determined feature points to be final feature points is configured to determine a point having a larger intensity than other points located in a surrounding area of a corresponding feature point to be a final feature point, based on the intensities of the feature points, and to determine important points $R_2(c_i)$ satisfying the expression $$R_2(c_i) = \left\{ c_i \,\bigg|\, f(c_i) > \max_{R_1(c_i)} [f(c_i)] \times T_1 \right\}$$

among the points located in the surrounding area of the feature point, where $c_i$ denotes an i-th feature point, $f(c_i)$ denotes intensity of the i-th feature point, $R_1(c_i)$ denotes a set of points in the surrounding area of the feature point, $$\max_{R_1(c_i)} [f(c_i)]$$

denotes a maximum value of intensities of $R_1(c_i)$, and $T_1$ denotes a threshold, and determine a feature point satisfying the expression $$f(c_i) > \frac{\sum_{c_i \in R_2(c_i)} f(c_i)}{\#(R_2(c_i))} \times T_2$$

to be the final feature point, where # denotes an operator for obtaining a size of the set and $T_2$ denotes a threshold.

3. An apparatus for generating feature data of an image, comprising:
   a feature point determination unit for determining feature points from an image and extracting feature point information for the determined feature points;
   a feature point orientation estimation unit for estimating pieces of orientation information for the respective feature points determined by the feature point determination unit; and
   a feature data generation unit for generating binary feature vectors based on the feature point information and the orientation information, for the respective feature points determined by the feature point determination unit, and generating feature data of the image including the generated binary feature vectors,
   wherein the feature data generation unit generates for the feature points, surrounding image areas including the respective feature points, aligns the generated surrounding images areas in an identical orientation, divides each of the aligned surrounding image areas into sub-regions, and generates the binary feature vectors based on averages of brightness values of the subs-regions.

4. The apparatus of claim 3, wherein the feature point orientation estimation unit calculates, for all points in a predetermined surrounding area of each feature point, surrounding gradients of the points, and obtains an average of orientations of the gradients, thus estimating orientation of the feature point.

5. The apparatus of claim 3, wherein each binary feature vector is generated by at least one selected from among difference vectors and double-difference vectors obtained from the averages of brightness values of the sub-regions.

6. The apparatus of claim 5, wherein selection of at least one from among the difference vectors and the double-difference vectors obtained from averages of brightness values of the sub-regions is performed in correspondence with respective bits of the binary feature vector.

7. The apparatus of claim 6, wherein a linear combination or a nonlinear combination is calculated for the difference vectors and the double-difference vectors selected in correspondence with the respective bits, and resulting values of the calculation are compared with a threshold, thus enabling values of corresponding bits of the binary feature vector to be determined.

8. The apparatus of claim 7, wherein alignment is performed based on a criterion preset for the respective bits of the binary feature vector.

9. The apparatus of claim 3, wherein the feature data of the image further includes one or more of location information, size information, and orientation information of each feature point.

10. The apparatus of claim 3, wherein the feature point determination unit further comprises a feature point filtering unit for determining one or more of the determined feature points to be final feature points.

11. The apparatus of claim 3, wherein:
   the feature point information extracted by the feature point determination unit includes intensities of the feature points, and
   the feature point filtering unit determines a point having a larger intensity than other points located in a surrounding area of a corresponding feature point to be a final feature point, based on the intensities of the feature points.

12. The apparatus of claim 11, wherein the feature point filtering unit determines important points $R_2(c_i)$ satisfying the expression $$R_2(c_i) = \left\{ c_i \;\middle|\; f(c_i) > \max_{R_1(c_i)} [f(c_i)] \times T_1 \right\}$$

among the points located in the surrounding area of the feature point where $c_i$ denotes an i-th feature point, $f(c_i)$ denotes intensity of the i-th feature point, $R_1(c_i)$ denotes a set of points in the surrounding area of the feature point, $$\max_{R_1(c_i)} [f(c_i)]$$

denotes a maximum value of intensities of $R_1(c_i)$, and $T_1$ denotes a threshold and determines a feature point satisfying the expression $$f(c_i) > \frac{\sum_{c_i \in R_2(c_i)} f(c_i)}{\#(R_2(c_i))} \times T_2$$

to be the final feature point where # denotes an operator for obtaining a size of the set and $T_2$ denotes a threshold.

13. A method of generating feature data of an image, comprising:
   determining feature points from an image and extracting feature point information for the determined feature points;
   estimating pieces of orientation information for the respective determined feature points; and
   generating binary feature vectors based on the feature point information and the orientation information, for the respective determined feature points, and generating feature data of the image including the generated binary feature vectors,
   wherein the step of generating feature data of the image including the generated binary feature vectors is configured to generate, for the feature points, surrounding image areas including the respective feature points, aligns the generated surrounding images areas in an identical orientation, divides each of the aligned surrounding image areas into sub-regions, and generates the binary feature vectors based on averages of brightness values of the subs-regions.

* * * * *